Oct. 27, 1942.  K. L. HERTEL  2,299,983
COTTON FIBER MEASURING INSTRUMENT
Filed Dec. 21, 1939  7 Sheets-Sheet 1
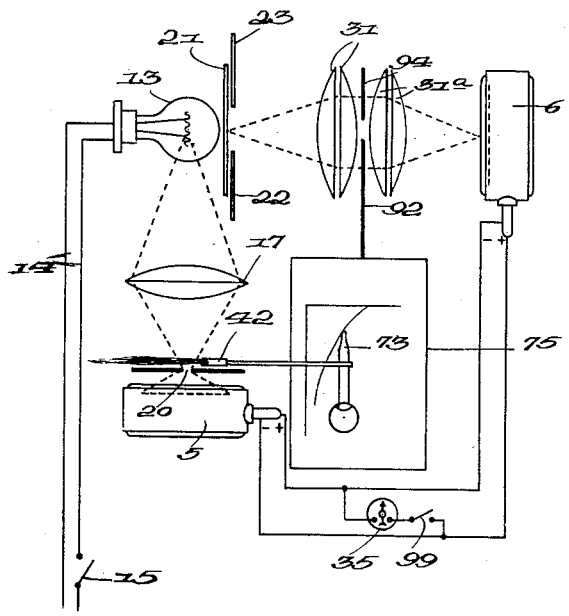
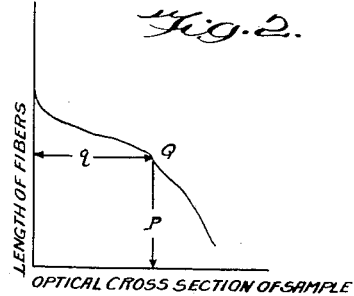
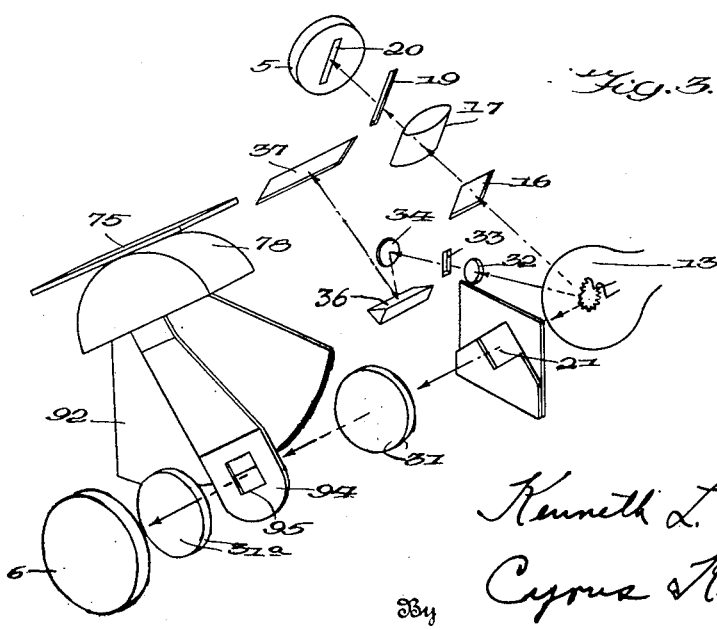
Inventor
Kenneth L. Hertel
Cyrus Kehr
By
Attorney

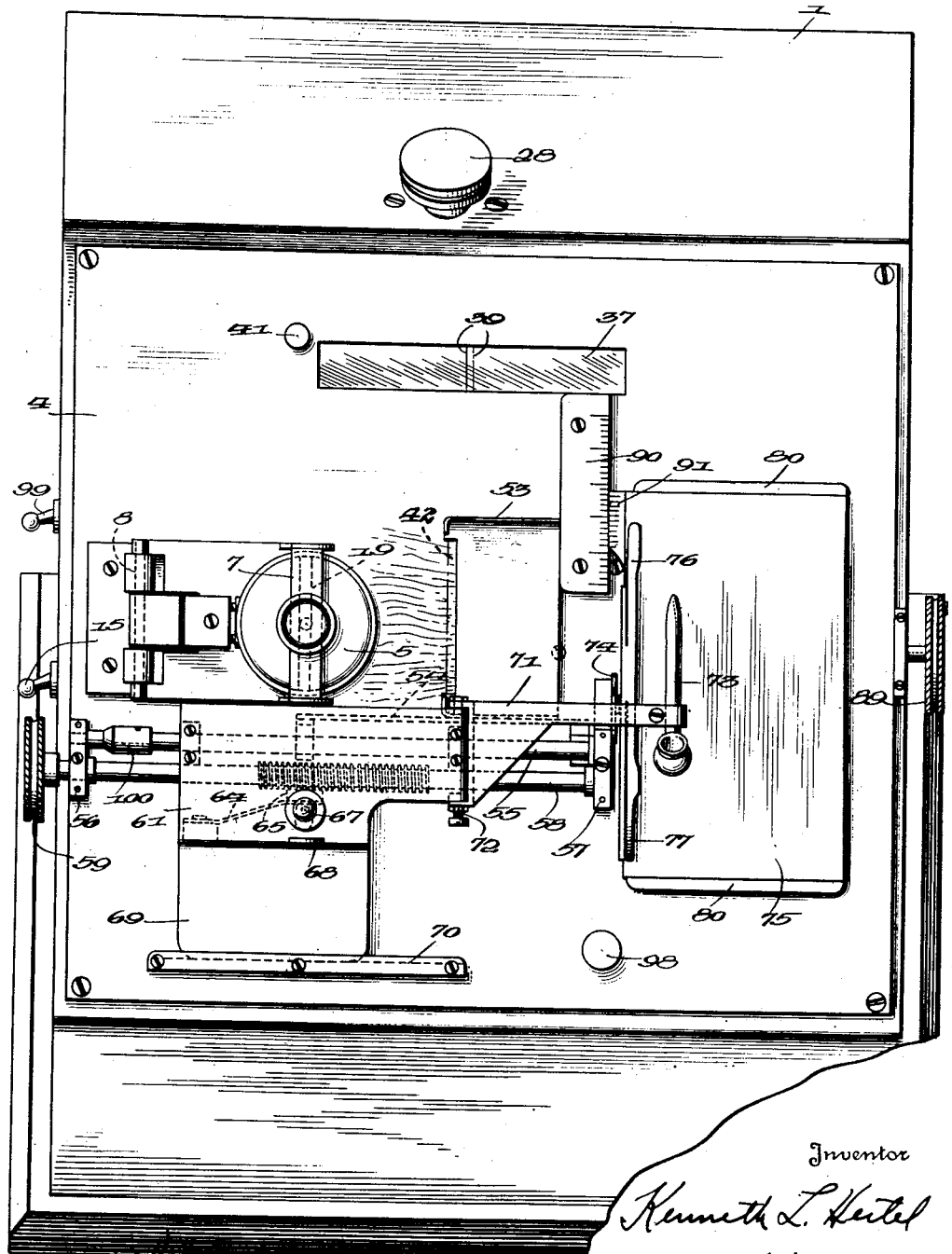

Oct. 27, 1942. K. L. HERTEL 2,299,983
COTTON FIBER MEASURING INSTRUMENT
Filed Dec. 21, 1939 7 Sheets-Sheet 3
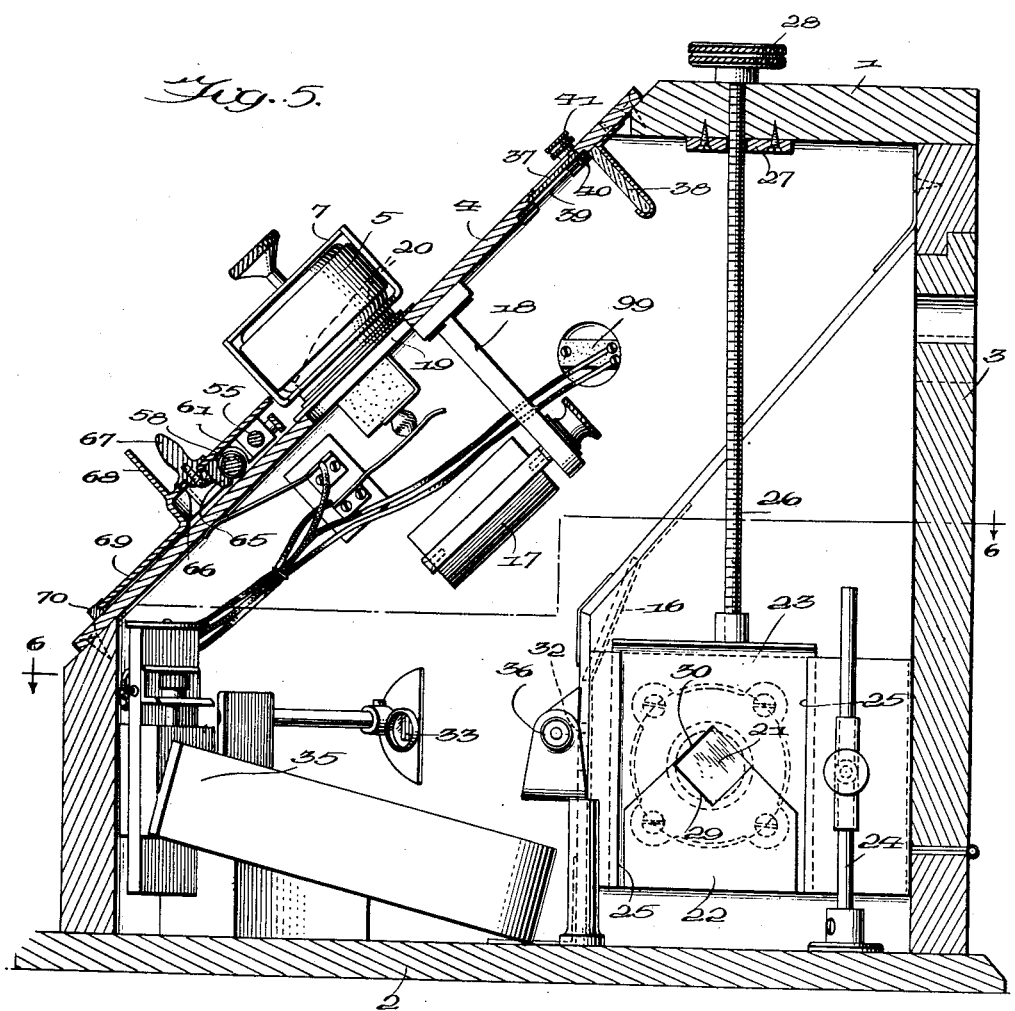
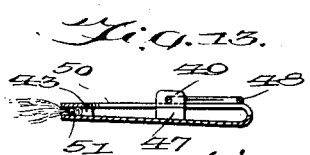
Inventor
Kenneth L. Hertel
By Cyrus Kehr
his Attorney

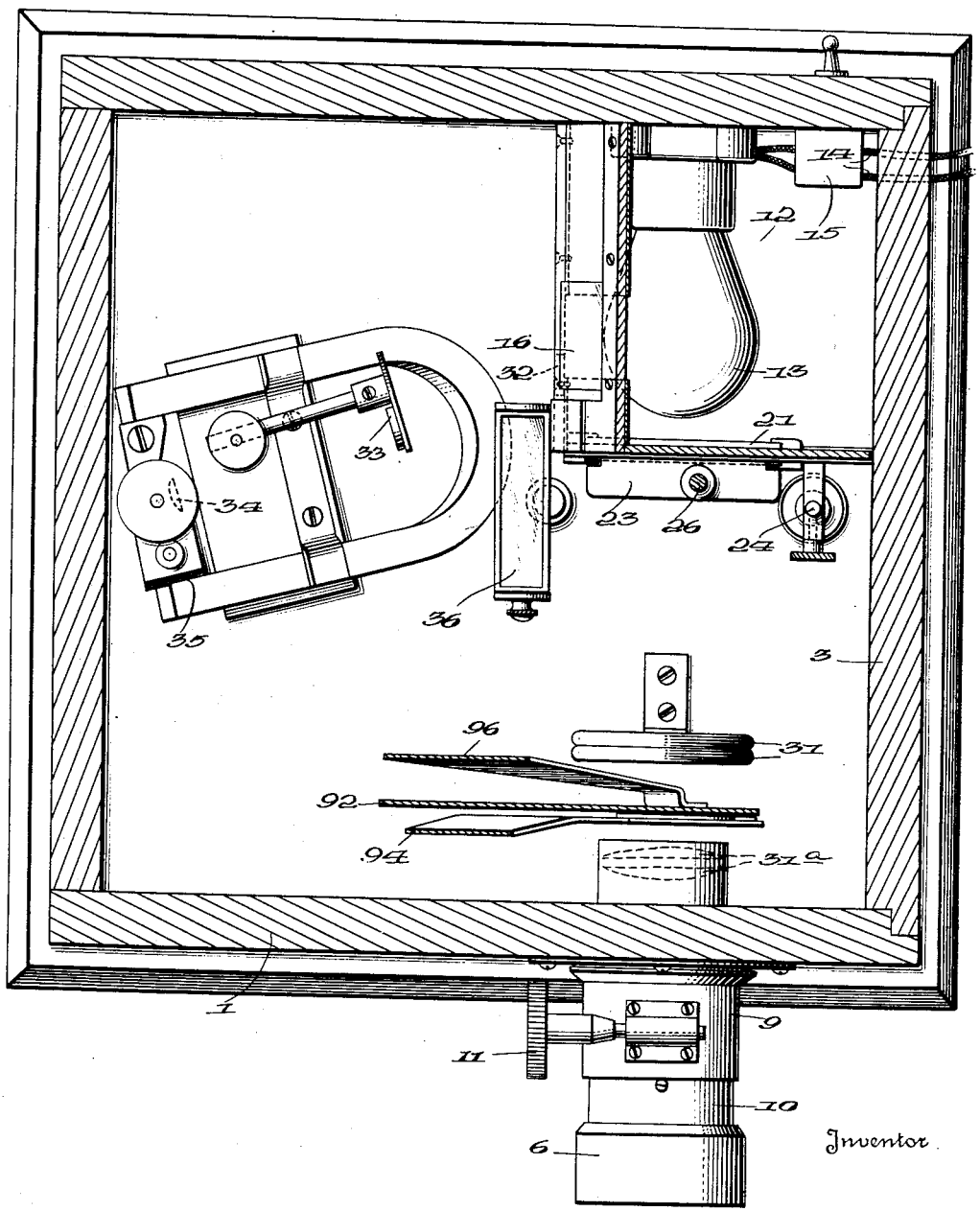

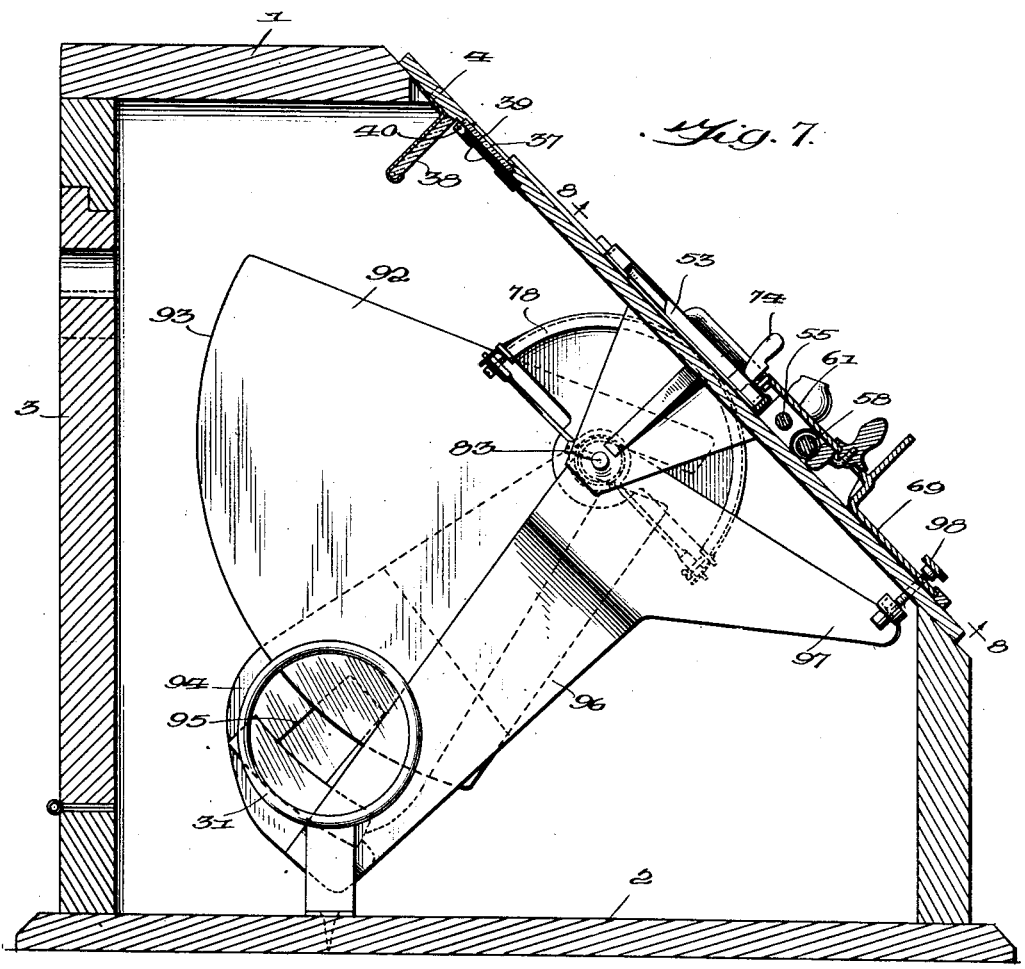
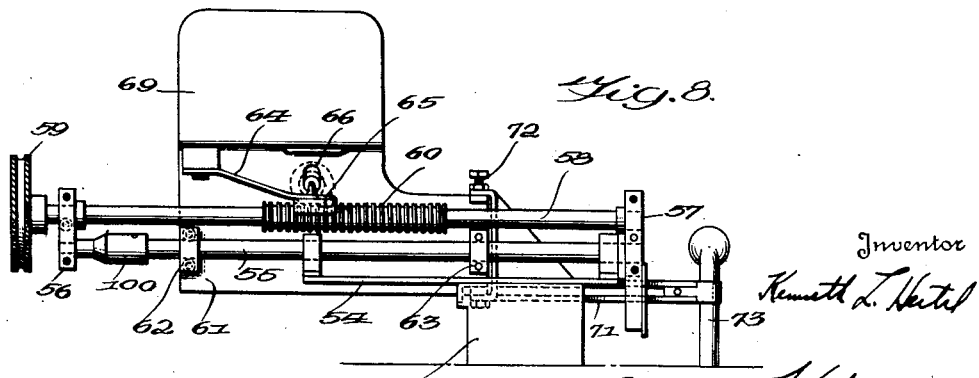

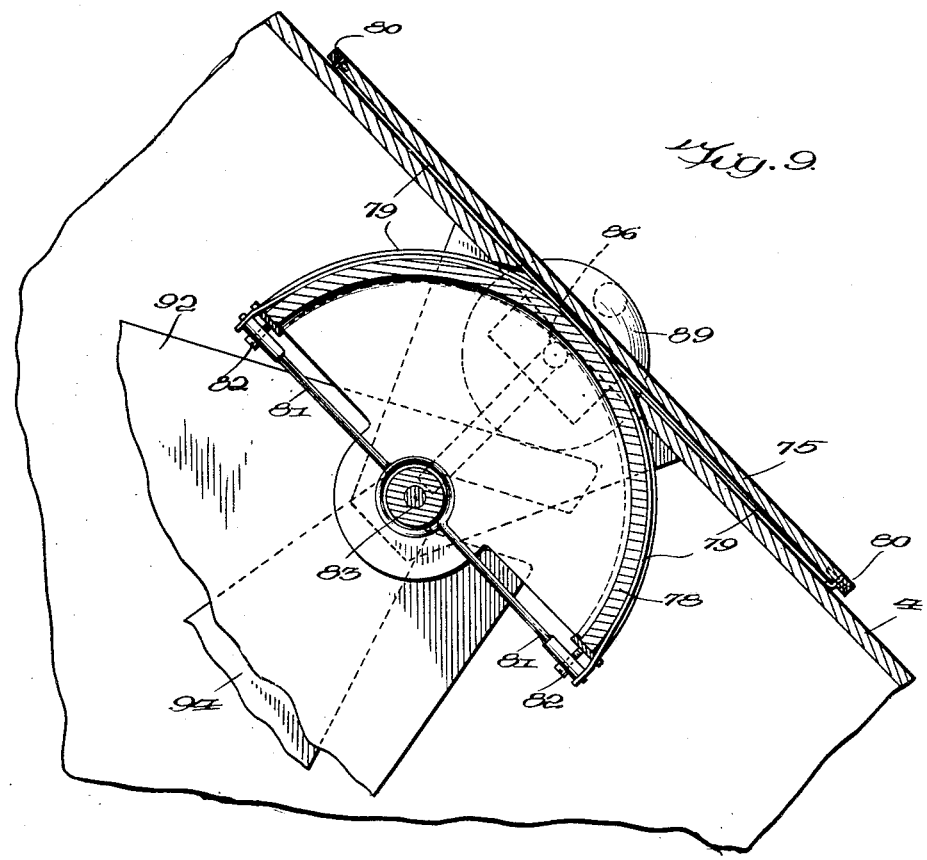
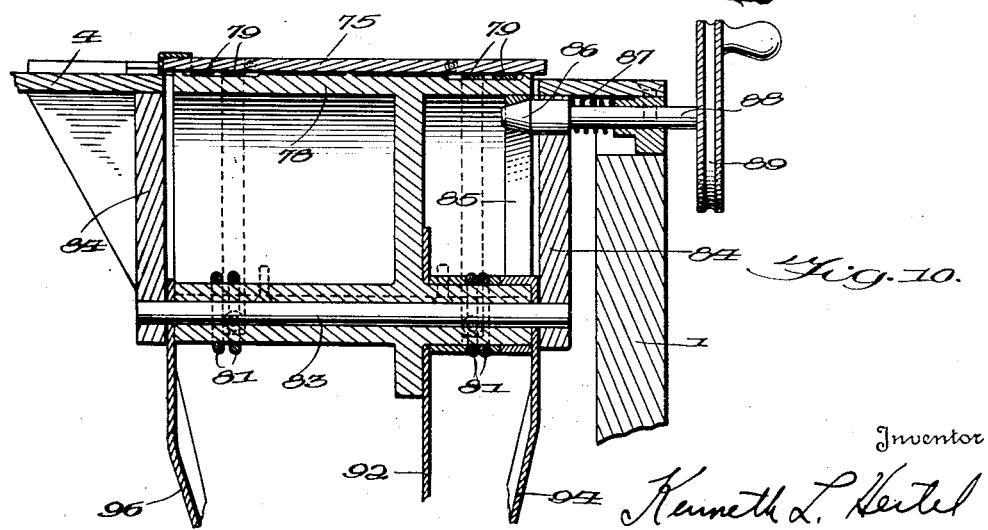

Oct. 27, 1942. K. L. HERTEL 2,299,983
COTTON FIBER MEASURING INSTRUMENT
Filed Dec. 21, 1939 7 Sheets-Sheet 7
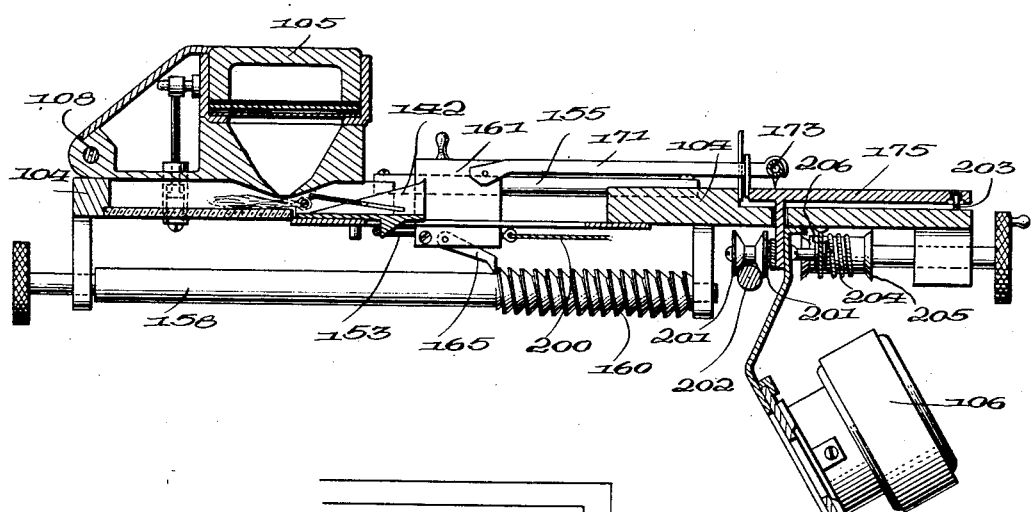
Fig. 14.
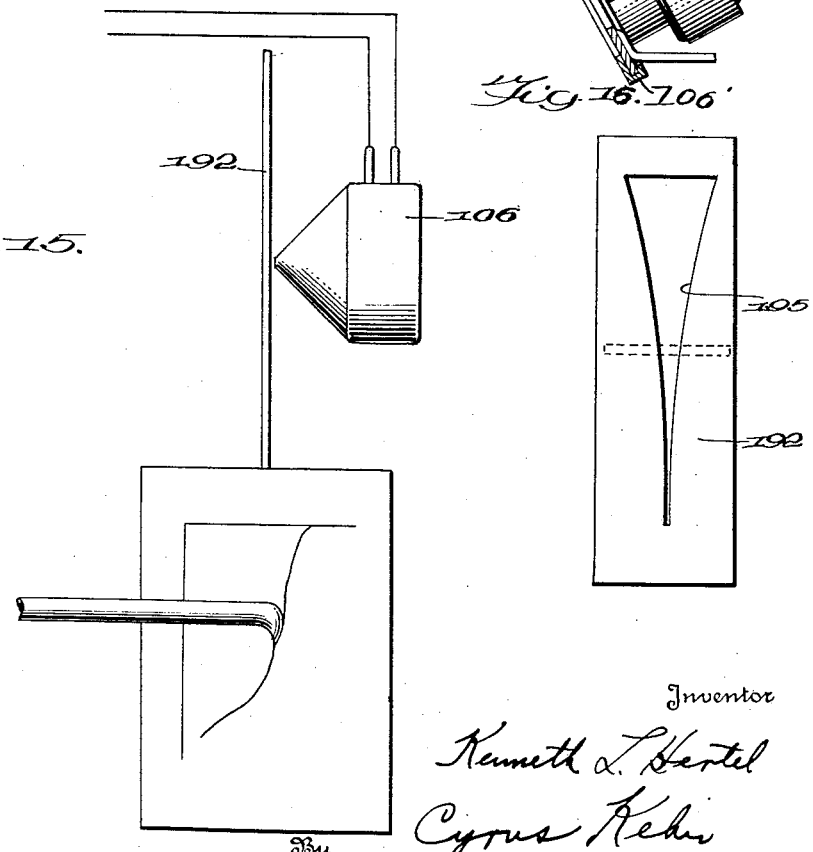
Fig. 15.
Fig. 16.
Inventor
Kenneth L. Hertel
Cyrus Kehr
By his Attorney Patented Oct. 27, 1942

2,299,983

UNITED STATES PATENT OFFICE 2,299,983

COTTON FIBER MEASURING INSTRUMENT

Kenneth L. Hertel, Knoxville, Tenn., assignor to University of Tennessee Research Corporation, Knoxville, Tenn., a corporation of Tennessee Application December 21, 1939, Serial No. 310,466

28 Claims. (Cl. 234—1.5)

This application is a continuation in part of my application, Serial No. 61,824, filed January 31, 1936.

This invention relates to an instrument for measuring primarily the length of fibers, particularly of cotton, by testing a representative sample thereof.

The length of cotton fibers is one of a number of properties that are of interest to the user of raw cotton. Since the length varies from fiber to fiber, a cotton sample is represented more completely by a length distribution curve than by any other single designation.

The measurement of the significant properties of cotton is a problem which has not been solved satisfactorily heretofore. At present, those methods which give accurate results consume too much time, and those that require little time give questionable results. The ideal method would give the accuracy of the laboratory with the speed of the cotton classer.

With this ideal in mind, this invention is aimed at the development of a method and instrument for measuring the tangible and significant property of cotton called "fiber length", or to determine the distribution of a cotton fiber population according to length.

If this is to be accomplished quickly, it is necessary to circumvent a direct mechanical analysis, which implies fractionating a sample into length groups, then counting or weighing the fibers in each group. A more indirect method of optical analysis is involved in this invention and offers the possibility of such a circumvention.

The optical method of analysis is based on the assumption that the amount of light flux passing through a sample of cotton is a function of the number of fibers in the path of the light. A convenient sample for analysis consists of a bundle of fibers arranged in substantially side-by-side or parallel relation and of different representative, or random lengths and with their ends substantially aligned at one end of the bundle and free at the other end. The number of fibers in the cross-section of this bundle, as well as the thickness of the bundle, is a maximum at the aligned end, and decreases gradually to zero at the other end. Likewise, the amount of light flux absorbed by this sample varies from a maximum adjacent the aligned end to zero at the other end.

This invention involves a method and an instrument for translating the variations in light absorption through the sample into an approximate length-distribution curve, and traces this curve directly on a chart as the sample is exposed to the light.

The sample may be prepared from ginned cotton by means of a sorter or similar device. Then it may be clamped or cemented together to hold the fibers in the aligned relation. An easier way to prepare the sample is to use the fibers growing from a limited area of the coat of a seed, thus taking advantage of the natural alignment of the fibers by virtue of their attachment to the seed. To prepare the seed sample, the fibers of a seed are carefully combed and haloed in the familar way. A portion of the halo is selected for analysis and the rest of the fibers are discarded. The seed is then secured in a holder and the sample is ready for analysis. Several seed samples may be clamped side by side in a holder and all of them analyzed simultaneously. The resulting curve represents the composite sample.

The aligned-end sample is not necessary to the optical analysis. Another type of sample that may be used is one where the fiber ends are distributed at random. To obtain this type of sample, slivers, rovings, or yarn may be clamped on a transverse line and the fibers combed out substantially parallel. The ends of the fibers extending beyond the edge of the clamp are then analyzed. The same type of sample may be obtained from completely disarranged fibers by means of a novel and effective sample holder and sampler which constitutes one of the features of this invention. The curve produced by the random sample has a different interpretation from the curve produced by the aligned-end sample, but they are mathematically related.

The optical method of analysis involves the use of light responsive devices, such as photoelectric cells, connected in series, and having a galvanometer connected thereacross in parallel. No current flows in the galvanometer when the currents in the two photoelectric cells are exactly equal. This condition can be maintained as long as the amounts of light flux reaching the two cells bear a constant ratio to each other. Any variation in this ratio causes a current to flow in the galvanometer, producing a deflection. Provision is made in this invention for exhibiting this deflection optically, by mounting a reflector on the galvanometer for deflecting a beam of light onto a dial on the face of the instrument.

The cotton sample is placed in front of one of the photoelectric cells so that all of the light reaching said cell must pass through it. A shield is arranged in front of the other cell to control the amount of light flux passing thereto. With the system balanced, the cotton sample is moved relative to its associated photoelectric cell. Such movement decreases the number of fibers in front of said cell, allowing more light flux to reach it, and thereby causing a deflection in the galvanometer. Balance is restored by moving the shield in front of the other cell to increase the amount of light passing thereto, proportional to the change in the amount of light passing to the first cell.

By watching the galvanometer dial, the operator may move the cotton sample and shield gradually and continuously without altering the electrical balance appreciably. By recording on a chart this relative motion of the cotton sample and shield, a graph is obtained, which I term a "fibrogram."

According to the instrument devised, the chart is operatively attached to the shield and a pen or other marking device is attached to the cotton sample so that when these are moved relative to each other, the pen traces a curve on the chart. Any point in the resulting "fibrogram" has for its ordinate the distance that the cotton sample has traveled in front of its associated photoelectric cell, and for its abscissa a distance proportional to that which the shield must travel to reach the axis of zero cotton, where the cotton sample will have passed from in front of the photoelectric cell. This abscissa is here called the optical cross-section of the sample, and is related to the number of fibers remaining in front of the first cell at said point. The shield or its opening should be so shaped that the abscissa is directly proportional to the number of fibers in front of its associated cell, and the "fibrogram" then becomes a curve plotted between the length of fibers as ordinates and the cumulative numbers of fibers as abscissae.

In this way, length distribution curves can be obtained quickly, and without great skill. Such distribution curves are obtained without requiring a sorter and without the necessity of fractionating the sample, thus, greatly simplifying and speeding up the work.

I have shown in the accompanying drawings, a preferred embodiment of my invention together with modifications thereof, in which:

Fig. 1 is an electrical and optical diagrammatic view of some of the parts of the invention.

Fig. 2 is a view of one of the charts or graphs.

Fig. 3 is an optical diagrammatic perspective view of the essential parts of the invention.

Fig. 4 is an elevation of the cover plate assembly and casing.

Fig. 5 is a transverse vertical sectional view through the complete instrument.

Fig. 6 is a horizontal sectional view therethrough, substantially on the line 6—6 of Fig. 5.

Fig. 7 is a transverse vertical sectional view, looking in the opposite direction from Fig. 5.

Fig. 8 is a bottom plan view of the sample and pen operating mechanism, taken substantially on the line 8—8 of Fig. 7.

Fig. 9 is a transverse vertical sectional view through the card holder and cylinder.

Fig. 10 is a longitudinal sectional view therethrough, approximately at right angles to Fig. 9.

Fig. 11 is a perspective view of the cotton holder or clamp.

Fig. 12 is an edge view thereof.

Fig. 13 is a transverse sectional view through said clamp.

Fig. 14 is a longitudinal sectional view through a modified form of measuring instrument.

Fig. 15 is a diagrammatic view of a modification in the light shield.

Fig. 16 is a front elevation of said modified form of light shield.

The measuring instrument is constructed for compactness and portability, and accordingly, the operating parts are mounted in a casing, designated generally by the numeral 1 in the drawings and provided with a bottom 2, while one side of the casing has a door 3 for gaining access thereto.

All of the parts of the measuring instrument which require handling and observation are mounted on a base plate 4, placed at an angle of 45 degrees to the horizontal for easy access and visibility.

The measuring instrument utilizes two photoelectric cells 5 and 6, mounted respectively, on the base plate 4 and on a side wall of the casing 1, as shown in Figs. 4 and 6. The photoelectric cell 5 is mounted in a frame 7, hinged at 8 to the base plate 4, so that the photoelectric cell 5 may be swung away from the base plate in arranging the cotton sample therebeneath.

As shown in Fig. 6 the photoelectric cell 6 is secured by a housing 9 to a side wall of the casing 1. A tube 10, which carries the photoelectric cell 6, is telescoped with the housing 9 and is adapted to be moved out and in relative thereto by a hand wheel 11, for adjusting the position of the photoelectric cell.

The casing 1 is provided with a lamp compartment 12 therein, as shown in Fig. 6 within which compartment an electric lamp 13 is mounted for illuminating the photoelectric cells. Current is supplied to the lamp 13 by a cable 14 controlled by a switch 15 mounted on one wall of the casing 1.

The light compartment 12 has a window 16 in a side thereof in the direction of the photoelectric cell 5, through which window light is directed to said photoelectric cell. As shown in Figs. 3 and 5, a lens 17 is mounted in the path of light to the photoelectric cell 5, said lens being carried by an arm 18 secured to the underside of the base plate 4. The base plate 4 is provided with a slot 19 therein for the passage of light therethrough, as shown in Figs. 3, 4, and 5, and a similar slot 20 is provided in the underside of the photoelectric cell 5, so as to restrict the amount of light reaching said cell to a predetermined area.

Referring to Figs. 5 and 6, the light compartment 12 has a frosted glass window 21 in a side thereof toward the photoelectric cell 6, for directing light to the latter. In order to regulate the area of the light opening through the window 21 and thereby the amount of light reaching said photoelectric cell 6, an iris is provided, comprising a pair of cooperating plates 22 and 23, the former of which is adjustably mounted on a standard 24 and has guides 25 for slidably receiving the plate 23. The plate 23 is mounted on the lower end of a rod 26 which is threaded and passes through a plate 27 secured to the top of the casing 1, and the upper end of said rod 26 has a knob 28 for rotating the same to thread the rod 26 through a threaded sleeve on the plate 23 and thereby adjust the plate 23 relative to the plate 22. The plates 22 and 23 are provided with cooperating V-shaped notches 29 and 30, respectively, in their adjacent edges to form an adjustable light opening, as shown in Fig. 5.

Arranged between the window 21 and the photoelectric cell 6 is a pair of lenses 31 for making the rays of light from the window 21 parallel as they pass through the shield opening, to be described hereinafter. After passing through said shield opening, these rays are focused on cell 6 by lenses 31ᵃ (Fig. 1) in the housing 9. This arrangement provides a more nearly uniform illumination over the shield opening, and produces an image of window 21 on the surface of cell 6, which image changes in intensity, but not in size, shape, or position with the change in the shield opening.

Light is also directed in a third direction from the light compartment 12, through an opening 32 in a side wall of said compartment, thence through a window 33 containing a vertical center wire, to a concave galvanometer mirror 34 carried on the movable arm of the galvanometer, designated generally by the numeral 35. The mirror 34 directs the beam of light onto a mirror 36, which in turn directs it to a window 37 in the base plate 4. A reflector 38 is mounted just above the window 37 and at right angles thereto, to facilitate the concentration of the light on the window. A pair of slightly spaced wires 39 are mounted to extend transversely of the window 37, and to be adjusted lengthwise thereof, for which purpose they are carried on a cable 40 which may be moved back and forth along the window 37 by a roller 41 over the inner end of which the cable 40 passes, in order to position the wires 39 in proper location during the initial adjustment of the instrument. The image of the wire in the window 33 should be located between the wires 39 for zero adjustment of the instrument.

The sample of cotton should be positioned over the slot 19 in the cover plate 4, under the slot 20 of the photoelectric cell. In order to hold and move the sample of cotton relative to the registering slots, a feature of this invention involves the use of a sample holder or clamp, designated generally by the numeral 42, and shown in detail in Figs. 11 to 13. This clamp is formed by bending a sheet of metal to U-shape and permanently securing the adjacent edges at 43 and 44 but only at the ends of the clamp, the intermediate portions being free to spread so as to form clamping jaws 45, for which purpose they are separated from the main portions of the clamp 42 by transverse slits 46. In order to spread the clamping jaws, a wedge member 47 is mounted therebetween to be moved back and forth transversely of the clamp by means of a ring 48 attached to an ear 49 of the wedge member 47, and which ear projects through a slot 50 in one of the clamping jaws 45. In order to hold the cotton fibers, a needle 51 is arranged lengthwise between the free edges of the jaws 45, as shown in Fig. 13, and has one end permanently secured to the spacer 43, while the opposite pointed end of said needle 51 projects into a guide mouth portion 52.

This form of clamp is particularly adapted to the collecting and holding of loose disarranged fibers. As the clamp or cotton holder is moved through loose cotton fibers in the direction of the arrow in Fig. 11, the jaws being held open by the wedge member 47, the pointed end of the needle will pick up the cotton fibers and direct them back between the clamping jaws 45 where they will arrange themselves around the needle, substantially as shown in Figs. 11, and 13, forming a sample for test. When a desired amount of cotton is on the needle between the clamping jaws, the wedge member 47 is moved in the opposite direction, allowing the spring jaws 45 to close and clamp the cotton in place. The fibers are combed and rearranged, and the sample is then ready for test.

As shown in Fig. 4, the cotton holder or clamp 42 is mounted in a carrier 53, so that the sample of cotton may be moved forward over the slot 19 in the base plate 4. The carrier 53 is fixed to a guide 54 slidable on a rod 55, the opposite ends of which rod are fixed in brackets 56 and 57, as shown in Fig. 8.

Also mounted in the brackets 56 and 57 is a shaft 58 the outer end of which carries a hand wheel 59 for rotation of the shaft, while an intermediate portion of the shaft has a worm 60 formed thereon.

A plate 61 overlies the rod 55 and shaft 58, and has guides 62 and 63 on the underside thereof, slidable on the rod 55. The guide 63 is in position to engage one end of the guide 54 for the sample carrier 53, to move the latter in a direction away from the slot 19 in the base plate 4. In order to provide for gradual movement of the sample carrier, the plate 61 carries a leaf spring 64, on the free end of which is a half nut 65 cooperating with the screw 60 and pressed thereagainst by the leaf spring 64 to mesh with the screw, so that upon rotation of the screw by the hand wheel 59, the plate 61 will be moved lengthwise for movement of the cotton carrier 53. A slot 66 is formed in the plate 61, through which a pin 67 projects for withdrawing the half nut 65 from meshing with the screw, in order to move the plate 61 in one direction or the other without rotation of the screw, as for instance when returning the plate 61 to its starting position in order to draw the axis of fiber length. A thumb rest 68 is provided on the plate 61 to facilitate the movement of the pin 67.

The plate 61 is shown as provided with a laterally projecting portion 69 received in a guide 70 which portion was designed to receive a planimeter, if desired, to measure the area under the curve of the chart as it is traced.

One end of the plate 61 has an arm 71 pivoted thereto as at 72, and the free end of the arm carries a pen 73 to inscribe the curve on the chart. In order to hold the pen in a raised position above the chart, a spring-pressed latch 74 is pivoted to the bracket 57 beside the arm 71, which latch has a portion in position to underlie the arm 71 when it is desired to hold the pen 73 in a raised position above the chart, but may be moved out from under the arm in order to lower the pen.

The chart holder is designated 75 and is shown in Fig. 4 as underlying the pen 73 at one side of the instrument. The chart holder 75 is provided with a spring clamp 76 along one edge thereof, which clamp 76 has a raised portion 77 near the lower end thereof, so that when the holder 75 is moved upward to its uppermost position in drawing the axis of zero cotton, which is the last step in making a graph, the raised portion 77 presses upward on the arm 71 to raise the pen 73 away from the chart, and the spring-pressed latch 74 engages under the arm to hold the pen off the surface during the preparation for the making of another chart.

As shown in Figs. 9 and 10 the chart holder 75 is mounted on a segmental cylinder 78, to which it is connected by flexible bands 79, one end of each of which is attached to an end of the chart holder 75 by a clamping bar 80 while the other end thereof is attached to a clamping member 81 of the cylinder 78, and adjustable at 82 for varying the tension of the attached band 79. The cylinder 78 is rotatably mounted on a shaft 83 carried by the base plate 4 by means of brackets 84, and in order to rotate the cylinder about the shaft 83, and thereby move the chart holder 75 lengthwise, one edge of the cylinder 78 is provided with a track 85 against which a friction member 86 is pressed by a spring 87. The friction member 86 is on one end of a shaft 88, the opposite end of which carries a hand wheel 89 for rotating the shaft and friction member 86 to turn the cylinder 78 and move the chart holder 75 lengthwise.

To indicate the extent of movement of the chart holder 75, a scale 90, shown in Fig. 4 is attached to the base plate 4 and cooperates with a vernier scale 91 attached to the chart holder 75, so that the extent of movement will be indicated by the relative positions of these scales from a zero position.

Attached to the cylinder 78 to turn therewith is a cam 92, the peripheral edge 93 of which is not a segment of a circle, but an empirical curve, as shown in Fig. 7. A shield 94 has one end mounted on the rod 83, and projects outwardly therefrom, beyond the peripheral edge 93 of the cam 92, and the shield 94 is provided with a slot 95 adjacent the edge of the cam. The cam 92 cooperates with the slot 95 and regulates the extent of the passage of light therethrough. The shield 94 has an adjusting member 96 attached to the free end thereof beyond the cam 92, and said adjusting member is also mounted on the rod 83, but is provided with an arm 97, against which a screw 98 presses, in order to adjust the position of the shield 94. The screw 98 is threaded through the base plate 4. If the scale 90 is made adjustable relative to the scale 91, for the proper setting of the parts to zero positions, the screw 98 would be unnecessary and the shield 94 then may be secured rigidly in place.

As shown in Fig. 1, the photoelectric cells 5 and 6 are electrically connected in series, with the positive side of one connected to the negative side of the other. The galvanometer 35 is connected across and between the photoelectric cells, in parallel therewith, and a switch 99 controls the electrical connection of the galvanometer. The electrical conections are shown also in Fig. 5 for the cell 5 and leading to the galvanometer 35 from the switch 99.

In preparing the instrument for at test, the two wires 39 are adjusted by the roll 41 horizontally of the window 37, and serve as the zero point of the galvanometer dial. The image of the fine wire of the window 33 is placed midway between the wires 39 for zero adjustment. This adjustment is made when the galvanometer switch 99 is open and no current is flowing. When switch 99 is closed and the cam 92 is at its zero position, the iris at 29—30 is adjusted by the knob 28 to bring the image at 39 to zero. When the zero of scale 91 coincides with the zero of scale 90, the opening 95 is adjusted about the axis of the cam 92 by means of the screw 98, until the opening 95 coincides with zero of the cam. Most of these adjustments are made initially and do not require further adjustment. However, the adjustment of the galvanometer zero should be made frequently.

After the instrument is thus adjusted, the first step in making a test is to provide a sample of cotton fibers. As described above, the clamp 42 is moved over the disarranged cotton fibers in the direction of the arrow in Fig. 11, while the jaws 45 are held apart by the wedge 47. Fibers that are hooked over the needle 51 slip along the needle between the clamp jaws. When a sufficient number of fibers to constitute a bundle have been collected, the jaws are closed and the sample combed. As the combing proceeds, thin places appear. The jaws may be opened then and the sample of fibers distributed uniformly. If the final sample is too thick, some of it may be removed and the remainder spread out uniformly. This prepared sample is then ready for a test.

A different clamp may be used in testing seed cotton fibers, or for parallel fibers in the mill. In any event, it is preferred that the fibers be arranged so that the bundle is thickest at one end (having the greatest number of fibers) and decreases progressively toward the other end.

In placing the sample in the measuring instrument, the photoelectric cell 5 is turned up about its hinge 8, to allow the sample of cotton to be placed under the cell and over the slot 19. The clamp 42 is placed in the carrier 53, and the latter moved to the left in Fig. 4, to its farthermost position. The plate 61 likewise should be moved to the left against stop collar 100 on the rod 55. Such movement may be accomplished by disengaging the half nut 65 from the screw 60 and sliding the plate along the rod 55.

The cotton sample is arranged over the slot 19 with the fibers arranged in side-by-side relation, preferably approaching parallelism and uniformly distributed and then the photoelectric cell 5 is turned down to its normal position over the cotton sample. When the switches 15 and 99 are closed, the photoelectric cells 5 and 6 will receive light from the lamp 13, but the light reaching the cell 5 will be less than that reaching the cell 6 in proportion to the number of cotton fibers interposed in the path of the beam. The cam 92 is now adjusted by the hand wheel 89 until the galvanometer dial 37 shows zero. The pen 73 is released by the latch 74, after the placing of a card on the carrier 75, and the recording of a graph begins.

As the sample is moved to the right, relative to the slot 19, by turning the hand wheel 59, the hand wheel 89 is adjusted simultaneously therewith to keep the image of the wire in the window 33 between the wires 39 of the dial. The operator will be able to move the hand wheels 59 and 89 almost continuously in maintaining this registry, and during such movement the pen 73 and the card on the holder 75 will have relative motion to inscribe the curve of the graph.

The bundle of fibers comprising the sample is moved relative to the photoelectric cell in front of the same and across the path of the light passing thereto, said bundle being moved in a direction lengthwise of the fibers in the sample, preferably from the end of greater density toward the end of less density, whereby the light flux on said cell will vary in proportion to the density of the sample, progressively increasing as the sample is moved along, which variation will be indicated by the light beam projected by the optical system onto the window 37.

When the longest fibers of the cotton sample have passed beyond the analyzing slot 19, the curve or graph becomes horizontal, as shown in Fig. 2, after which, the pen is moved in a straight line to the left relative to the holder 75 to trace the ordinate axis on the card, and, thereafter, the holder 75 is moved up relative to the pen to trace the axis of abscissa, thereby completing the graph, of which an example is shown in Fig. 2. The chart in Fig. 2 is shown in its usual position for reading when out of the machine, while Fig. 1 shows the chart in the machine where it will be turned relative to the position illustrated in Fig. 2.

Any point, such as the point Q in this graph has as its ordinate the distance $p$ that the cotton has traveled in front of the slot 19, and for its abscissa, the distance $q$ which is proportional to the distance that the cam 92 must travel in order to reach the axis of zero cotton. This abscissa is here called the "optical cross-section of the sample." The mean ordinate of the graph may be obtained by dividing the area under the curve by its base.

A planimeter may be used for obtaining the area of the graph as the latter is traced. In the case of the aligned sample the mean ordinate represents the average length of the fibers.

The cam edge on the shielding member 92 coacts with the slot 95 in the shield 94 to provide an opening through which the light passes to the balancing cell 6. This opening is variable in size somewhat similar to an iris. The curved edge of the cam shielding member 92 is an empirical curve, the shape of which, determining the size of the opening or iris through which the light may pass to the balancing cell, should be such that the abscissa of the graph (the displacement of the card holder) is directly proportional to the number of fibers in front of the balancing cell. This shape or curve may be determined in various ways.

The shape of the curved edge of the iris depends upon the optical properties of the fibrous material and the arrangement of the parts of the instrument. There are two general arrangements that may be employed. In one case the analyzing cell is placed near the fibers to collect all of the transmitted and scattered light, while in the other the analyzing cell is placed at some distance from the fibrous material in order to collect only the transmitted light that is unaffected by the fibers. The small amount of scattered light reaching the cell may be neglected.

In the first method, the light varies according to the following equation proposed by Silberstein (Silberstein, Ludwig, "Transparency of Turbid Media," Phil. Mag. IV, 1291 (1927):

$$2\beta/y = (\alpha+\beta)e^{\beta n} - (\alpha-\beta)e^{-\beta n}$$

in which $y$ is the total light passing through the sample, $\alpha$ and $\beta$ are optical constants of the material, and $n$ is the number of particles.

In the second method, the light varies according to the following equation:

$$y = y_0 e^{-kn}$$

where $y_0$ is the amount of light when no fibrous material is present, and $k$ is an arbitrary constant; $n$ is again the number of fibers in front of the slit. The fibers are assumed to be substantially perpendicular to the analyzing slit and to the light rays.

Since the form of the cam edge of the iris depends upon the method and the particular arrangement of the instrument parts, it is not possible to obtain the desired results in every case with a cam of a particular form. The form must be empirical and suited to the arrangement of the optical parts of the instrument. It is necessary, therefore, to test each instrument against a standard sample. The simplest standard sample consists of a group of parallel fibers of varying lengths which form a wedge. Starting from the apex and going toward the base of the wedge, the number of fibers should be proportional to the distance from the apex. Such a sample gives a straight line graph with a cam of the proper shape.

The formation of such a fibrous wedge is difficult and tedious. It has been found from experiment that the constant for the Silberstein equation is the same for white linen-embossed Cellophane as for cotton with the sheets superposed and of progressively shorter length, as for instance 2 mm. shorter; although, the steps of the sheets may be of different lengths, instead of the same length, to obtain a shield of different optical properties. A wedge made of Cellophane, therefore, gives the same shape graph as a wedge of fibrous material and, since the Cellophane wedge can be formed much more easily, it may be used as a standard for the instrument when the latter is used on cotton.

The approximate shape of the cam edge is known for a given arrangement of optical parts. The cam edge is then altered if necessary so that the graph of the wedge is substantially a straight line or conforms to a predetermined standard.

Using the second method, the light transmitted by the iris opening is compared directly with that transmitted by a neutral optical wedge and the cam edge formed in such a way that it alters the light to the same degree as the wedge.

The instrument may be used also to determine the average profile of a sample of fibers of equal length. By "average profile" is meant the average shape of the longitudinal section of the fibers in the sample. To determine the average profile, an aligned sample is prepared from fibers of approximately equal length. When this sample is analyzed the number of fibers remains constant from one end of the sample to the other, so that the variations in the light flux transmitted by the sample are due to variations in the thickness of the fibers. The abscissa of the resulting curve is approximately proportional to the square root of the linear density of the fibers. Therefore, the curve is a picture of the mean profile of the fibers in the sample.

In Fig. 14, I have shown a modification in a portion of the structure of the measuring instrument, in which the cotton analyzing photoelectric cell 105 is hinged at 108 to the base plate 104, substantially as described above.

In this form of the invention, the sample holder is shown at 142 to move the sample of cotton in front of the photoelectric cell 105. Carrier 161 is slidable on guide rod 155, which has an arm 171 pivoted thereto, carrying the pen 173 on the outer end thereof for tracing the curve on the chart.

A cable 200 is attached to the carrier 161 and may have its opposite end wound on spiral-spring-drum, constantly tending to pull the carrier 161 to the right, in Fig. 14, thus holding pawl 165 against screw 160 formed on shaft 158, thereby moving the carrier 161 to the right when shaft 158 is rotated, and dragging with it the sample holder 142 by means of hook 153. When the graph has been traced and it is desired to trace the axis of zero cotton, the carrier 161 is moved to the left to its extreme position, which is permitted by the pawl 165.

The chart holder 175 is supported at three points. Two of these are grooved wheels 201, which ride on guide rod 202 as a track. The other is a small wheel 203 which rides on the surface of base plate 104. A cable 204 has one end fastened to the base plate 104 and the other end passes around and is secured to a drum 205 and over a pulley 206 attached to the chart holder 175. The chart holder is moved by winding the cable 204 on the drum 205 by means of hand wheel 189. The weight of the chart holder and assembly keeps the cable taut, but a friction brake may be provided, if desired, on the drum 205 in order to hold the chart holder in any desired position. Carried by the base plate 104 is a bracket 106 supporting the photocell 106.

This is an alternative form of operating and control mechanism that may be used if desired.

Another modification is shown in Figs. 15 and 16, in which there is arranged in front of the balancing photoelectric cell 106, a slotted shield 192, with a slot 195 therein, and arranged in the path of the light passing to the balancing photoelectric cell. The shape of this slot is such as to vary the amount of light passing to the balancing photoelectric cell 106, in accordance with variations in the cotton being moved in front of the analyzing photoelectric cell 105, as the cotton sample is moved relative thereto. The shield 192 is attached to the chart holder in order to move therewith.

Other modifications may be made in the instrument, according to different conditions encountered, or differences in the cotton samples being tested. For instance, it may be desirable to analyze several samples simultaneously, which would involve more than a pair of cells.

The term "exhibiting" is used in the claims to describe the comparison in light reaching the respective cell structures, is intended to include indicating, registering, recording, computing or otherwise determining the light reaching the cell structures.

By the terms "shield" or "optical shield," as used in the claims, is intended and designated, not merely an opaque shield, but also any other means for shielding, screening, diverting, deflecting, or reflecting the light for the purpose described.

I claim:

1. A method of measuring fiber length comprising projecting light onto a light responsive device, and relatively moving a plurality of fibers extending substantially in side-by-side relation and of representative lengths through the path of light to said device to vary the light flux on the device for different positions of the fibers relative thereto.

2. A method of measuring fiber length comprising projecting light onto a light sensitive cell, collecting a bundle of substantially parallel fibers of representative lengths, moving said bundle of fibers through the path of light to said cell, and exhibiting the variation of light flux on the cell for different positions of the bundle of fibers relative thereto.

3. A method of measuring fiber length comprising collecting a bundle of substantially parallel fibers of random lengths with the fibers so arranged in the bundle as to produce relatively dense and thin portions at different points thereof, projecting a beam of light onto a light sensitive cell, interposing first the dense portion of said bundle in the path of said beam and then moving said bundle lengthwise of the fibers across said beam, and exhibiting the variation in light flux on the cell.

4. A method of measuring fiber length which comprises preparing a bundle of fibers of representative lengths in such manner that the fibers are substantially in side-by-side relation and the bundle is thickest at one end and grows progressively thinner toward the other, projecting a beam of light onto a light sensitive cell, moving said bundle in a direction lengthwise of said fibers across the path of said beam, and exhibiting the variation of light flux on said cell resulting from the movement of said bundle to successive positions.

5. A method of measuring fiber length which comprises preparing a bundle of substantially parallel fibers of random lengths with the fibers arranged in such manner that the number of fibers is a maximum at one end of the bundle and decreases progressively toward the other end, projecting a beam of light onto a light sensitive cell, moving said bundle in a direction lengthwise of said fibers across the path of said beam, and exhibiting the relative amount of light flux reaching said cell through said bundle as the latter is moved successively to each of a plurality of different positions.

6. A method of measuring fiber length which comprises preparing a bundle of substantially parallel fibers of random lengths in such manner that the bundle is thickest at one end and grows progressively thinner toward the other, projecting a beam of light onto a light sensitive cell, interposing one end of said bundle in the path of said beam, moving said bundle longitudinally of itself across said beam so that portions thereof of progressively varying density are successively brought into the path of the beam, and exhibiting the variations of the light flux on said cell for the different positions of the bundle relative thereto.

7. A method of measuring fiber length comprising projecting light onto a plurality of light sensitive cells, moving a bundle of fibers of different lengths lengthwise of the fibers through the path of light to one of said cells, and exhibiting the change in light flux on said cell relative to another of said cells for different positions of the bundle of fibers relative to the first-mentioned coil.

8. A method of measuring fiber length comprising projecting light onto different light sensitive cells, moving fibers lengthwise through the path of light in front of one of said cells, exhibiting the differential of light flux on the cells, and controlling the light projected onto the other cell to compensate for the differential of light flux caused by the fibers.

9. A method of measuring the length of textile fibers comprising projecting light from a single source onto different light sensitive cells, moving the textile fibers lengthwise through the path of light in front of one of said cells, exhibiting the differential of light flux on the cells, controlling the light flux on a second cell, and coordinating the movement of the textile fibers with the control of the light flux on the second cell.

10. A method of measuring the length of textile fibers comprising projecting light from a single source onto different light sensitive cells, arranging the textile fibers in front of one of said cells for lengthwise movement relative thereto, arranging a shield in front of the other cell for regulating the light flux passing thereto, exhibiting the differential of light flux on the cells, and coordinating the lengthwise movement of the textile fibers with the movement of the light shield to maintain approximately constant ratio of light flux on the cells.

11. A method of measuring the length of textile fibers comprising projecting light from a single source onto different light sensitive cells, arranging the textile fibers in front of one of said cells for lengthwise movement relative thereto, arranging a shield in front of the other cell for regulating the light flux passing thereto, exhibiting the differential of light flux on the cells, coordinating the lengthwise movement of the textile fibers with the movement of the light shield to maintain approximately constant ratio of light flux on the cells, and charting the relative movements of the cotton fibers and shield in the form of a graph.

12. A method of testing material comprising projecting light onto different light sensitive cells, causing relative movement of the material transversely through the path of light to only one of said cells thereby varying the light flux reaching said cell, simultaneously with said movement of the material gradually shielding the light projected on the other cell in varying degrees in proportion to the variation in light flux transmitted to the first-mentioned cell caused by the relative movement of the material and cell, and exhibiting the variation in light flux on the cells for different relative positions of the material.

13. A method of measuring fiber length comprising projecting beams of light onto a pair of light responsive devices, preparing a group of substantially parallel fibers of different representative lengths, with the fibers arranged in such manner that the number of fibers is a maximum at one end and decreases progressively toward the other end, moving said group in a direction lengthwise of the fibers across the path of the beam to one of said devices, whereby the light flux on said device is progressively varied, moving a shield across the path of the beam to the other device in such manner as to similarly vary the light flux on said other device, whereby the ratio of light flux on said two devices is maintained substantially constant, and charting the relative movements of said fibers and shield to form a graph.

14. In a method of measuring fiber length, the steps of moving a sample of fibers of representative lengths arranged in side-by-side relation across a beam of light projected on a light responsive device producing variations of light flux therein, charting the variations of light flux in the form of a graph, and thereafter charting a zero axis of said graph when the fibers have been moved out of said light path and as a direct continuation of the graph charting movement.

15. In a method of measuring fiber length, the steps of moving a sample of fibers of representative lengths arranged in side-by-side relation across a beam of light projected on a light-responsive device producing variations of light flux therein, charting the variations of light flux in the form of a graph by moving a marking element over a surface in contact therewith, and thereafter charting a zero axis of said graph by said marking element when the fibers have moved out of said light path and while the marking element remains in contact with the surface.

16. In a measuring instrument of the character described, the combination of a light sensitive cell, means for projecting a beam of light onto said cell, means for holding a bundle of fibers arranged substantially in side-by-side relation and of representative lengths, means for moving said bundle of fibers in front of said cell across the path of the beam of light passing thereto, and means for exhibiting variations of light flux on the cell for different positions of the bundle of fibers relative thereto.

17. In a measuring instrument of the character described, the combination of a light sensitive cell, means for projecting a beam of light onto said cell, means for holding a bundle of substantially parallel fibers of random lengths free at one end, means for moving said bundle of fibers lengthwise of the fibers in front of said cell across the path of the beam of light passing thereto, and means for exhibiting variations of light flux on the cell for different positions of the bundle of fibers relative thereto.

18. In a measuring instrument of the character described, the combination of light sensitive cells, means for projecting light onto said light sensitive cells, means for moving a bundle of fibers in substantially side-by-side relation lengthwise of the fibers in front of one of said cells, and means for exhibiting the differential in light flux on the cells for different positions of the bundle of fibers.

19. In a measuring instrument of the character described, the combination of a pair of light sensitive cells, a source of light arranged to project light onto the cells, means for holding a sample of cotton fibers arranged lengthwise in front of one of said cells, a shield arranged in front of the other cell and constructed to compensate for the light obstruction of the fibers, means for exhibiting a differential between the cells caused by a differential of light flux projected thereon, means for moving the sample holding means for lengthwise movement of the fibers, and means for moving the shield in coordination with light transmission varied by the movement of the fibers as indicated by the exhibiting means.

20. In a measuring instrument of the character described, the combination of a pair of light sensitive cells, a source of light arranged to project light onto the cells, means for holding a sample of cotton fibers arranged lengthwise in front of one of said cells, a shield arranged in front of the other cell and constructed to compensate for the light obstruction of the fibers, means for exhibiting a differential between the cells caused by a differential of light flux projected thereon, means for moving the sample holding means for lengthwise movement of the fibers, means for moving the shield in coordination with light transmission varied by the movement of the fibers as indicated by the exhibiting means, chart holding means operatively connected with the shield and movable therewith, and graph forming means operatively connected with the sample moving means and movable therewith for producing a graph on said chart in coordinating the movements of the shield and sample.

21. In a measuring instrument of the character described, the combination of a sample carrier, a guide rod slidably receiving said carrier, a support having means for moving said carrier, and means for moving said support and carrier lengthwise of the guide rod.

22. In measuring instrument of the character described, the combination of a sample carrier, a guide rod slidably receiving said carrier, a support having means for moving said carrier, a shaft having a worm thereon, means connected with the support for engagement with the worm to move said support and carrier upon rotation of the shaft, and means for turning said shaft.

23. In a measuring instrument of the character described, a holder for a textile fiber sample arranged to position said sample, a guide rod for guiding the movement of the holder, a shaft mounted parallel with the rod and having a worm thereon, a support operatively connected with the holder for moving the same along the rod, means carried by the support for detachably engaging the worm for movement thereby upon rotation of the shaft, and an arm pivoted to said support and carrying marking means.

24. In a measuring instrument of the character described, the combination of a light sensitive cell, a shield arranged to control the supply of light flux to the cell, a chart holder, a cylinder attached to the shield for movement thereof, means for moving the cylinder, and means connecting the chart holder with the cylinder for linear movement of the chart holder upon rotation of the cylinder.

25. In a measuring instrument of the character described, the combination of a light controlling shield, a cylinder rigidly attached to the shield for movement of the shield in different directions upon rotation of the cylinder, a chart holder mounted for movement relative to the cylinder, flexible bands arranged in crossed relation and each having one end fixed to one side of the cylinder and the opposite end fixed to portions of the chart holder for moving the chart holder on rotation of the cylinder, and means for moving the cylinder.

26. In a measuring instrument of the character described, the combination of a light controlling shield, a cylinder attached to the shield for movement thereof on rotation of the cylinder, a chart holder, a guideway mounting the chart holder for rectilinear movement relative to the cylinder, flexible means connecting the chart holder with different sides of the cylinder for movement of the chart holder in different directions upon the rotation of the cylinder, and means for turning the cylinder for movement of the chart holder and shield.

27. In a measuring instrument of the character described, the combination of light sensitive cells, means for projecting light onto said light sensitive cells, means for moving a sample through the path of light to one of said cells, marking means connected with said sample moving means, an optical shield in the path of light to the other cell, and record card supporting means connected with said shield for movement therewith and in position for bearing of the marking means thereon, said shield having a curved edge so shaped that its displacement from a fiducial point causes a displacement in the record card supporting means that is directly proportional to the light obstructing property of the material in front of the first-mentioned cell when the shield is so positioned that the amount of light reaching the cells is substantially equal.

28. In a measuring instrument of the character described, the combination of light sensitive cells, means for projecting light onto said cells, means for moving a bundle of fibers lengthwise of the fibers through the path of light in front of one of said cells, and an optical shield in the path of light to the other cell, said shield having light shielding properties such that its displacement from a fiducial point is directly proportional to the number of fibers in front of the first-mentioned cell in the respective positions of the fibers and shield when the shield is so positioned that the amount of light reaching the cells is substantially equal.

KENNETH L. HERTEL.